United States Patent
Hori et al.

(10) Patent No.: US 8,550,200 B2
(45) Date of Patent: Oct. 8, 2013

(54) VEHICLE BODY FRAME OF MOTORCYCLE

(75) Inventors: Naoto Hori, Shizuoka-Ken (JP); Akimasa Hatanaka, Shizuoka-Ken (JP); Toshiaki Yagi, Shizuoka-Ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 87 days.

(21) Appl. No.: 13/109,221

(22) Filed: May 17, 2011

(65) Prior Publication Data

US 2011/0278085 A1    Nov. 17, 2011

(30) Foreign Application Priority Data

May 17, 2010    (JP) ................. 2010-113134

(51) Int. Cl.
*B62K 11/04*    (2006.01)

(52) U.S. Cl.
USPC .......................................................... 180/219

(58) Field of Classification Search
USPC .......................................................... 180/219
See application file for complete search history.

(56) References Cited

U.S. PATENT DOCUMENTS

| | | | | |
|---|---|---|---|---|
| 4,226,296 A * | 10/1980 | Higaki | ............ | 180/219 |
| 4,696,363 A * | 9/1987 | Enda | ............ | 180/219 |
| 4,852,678 A * | 8/1989 | Yamaguchi | ............ | 180/219 |
| 4,887,687 A * | 12/1989 | Asai et al. | ............ | 180/219 |
| 5,375,677 A * | 12/1994 | Yamagiwa et al. | ............ | 180/219 |
| 5,704,442 A * | 1/1998 | Okazaki et al. | ............ | 180/219 |
| 5,921,339 A * | 7/1999 | Matsuura | ............ | 180/219 |
| 6,318,743 B1 * | 11/2001 | Nakashima et al. | ....... | 280/152.1 |
| 6,695,089 B2 * | 2/2004 | Adachi et al. | ............ | 180/311 |
| 7,360,619 B2 * | 4/2008 | Adachi et al. | ............ | 180/219 |
| 7,383,909 B2 * | 6/2008 | Kawase | ............ | 180/219 |
| 7,575,083 B2 * | 8/2009 | Kosugi et al. | ............ | 180/219 |
| 7,644,795 B2 * | 1/2010 | Kawamura et al. | ............ | 180/219 |
| 7,694,985 B2 * | 4/2010 | Hoshi | ............ | 280/274 |
| 7,845,451 B2 * | 12/2010 | Morita et al. | ............ | 180/219 |
| 2005/0150703 A1 * | 7/2005 | Nakagome et al. | ............ | 180/219 |
| 2006/0283650 A1 * | 12/2006 | Kawamura et al. | ............ | 180/227 |
| 2008/0110688 A1 * | 5/2008 | Miyashiro et al. | ............ | 180/311 |
| 2008/0236524 A1 * | 10/2008 | Maehara et al. | ............ | 123/90.12 |

FOREIGN PATENT DOCUMENTS

| | | |
|---|---|---|
| JP | 6107261 A | 4/1994 |
| JP | 2004114719 A | 4/2004 |

* cited by examiner

*Primary Examiner* — Kevin Hurley
*Assistant Examiner* — Michael Stabley
(74) *Attorney, Agent, or Firm* — Barnes & Thornburg LLP

(57) ABSTRACT

A motorcycle having a vehicle body and a vehicle body frame. The vehicle body frame includes a head pipe; a pair of left and right tank rail portions including a widening portion having a width increasing in a vehicle width direction extending rearward of the vehicle from the head pipe, a parallel portion having a substantially fixed width, and a narrowing portion having a width decreasing the vehicle width direction, the widening portion, the parallel portion and the narrowing portion extend along left and right sides of the vehicle body of a motorcycle; and a pair of left and right rear arm bracket portions bending and extending from rear ends of the tank rail portions. The vehicle body frame has a front frame part and a rear frame part connected through a frame connecting surface substantially perpendicular to an axial direction of the parallel portion.

2 Claims, 3 Drawing Sheets

VEHICLE BODY FRAME OF MOTORCYCLE

PRIORITY CLAIM

This patent application claims priority to Japanese Patent Application No. 2010-113134, filed May 17, 2010, the disclosure of which is incorporated herein by reference in its entirety.

BACKGROUND OF THE INVENTION

1. Field of the Invention

The present invention relates to a vehicle body frame of a motorcycle.

2. Description of the Related Art

A motorcycle has a vehicle body frame and a known main frame constituting a conventional vehicle body frame of a motorcycle is formed of a front frame and a rear frame separated from each other, and connected by means of welding or the like so as to provide an integrated main frame structure of a motorcycle.

For example, Patent Document 1 (Japanese Patent Application Laid-Open Publication No. 2004-114719) discloses a vehicle body frame of a motorcycle in which front ends of rear arm brackets are welded to rear ends of a pair of left and right tank rails.

Patent Document 2 (Japanese Patent Application Laid-Open Publication No. 6-107261) also discloses a frame structure of a motorcycle in which volume ratios of a front frame and a main frame are substantially the same. In such frame structure, a joining portion between the front frame and the main frame is formed into a shape of a matching surface of a jigsaw puzzle, and a joining length of the joining portion is designed so as to be longer than a joining length necessary and sufficient for obtaining strength as a vehicle body frame of a motorcycle.

For a main frame constituted by a front frame and a rear frame separated from each other, the front frame and the rear frame are each formed by casting or the like, and then joined together by means of welding, for example. At this time, it is preferred that connecting surfaces (joining surfaces) of the front frame and the rear frame are accurately abutted against each other and then joined.

However, as in the vehicle body frame disclosed in Patent Document 1, in a structure in which a front frame (or a rear frame) is increased in size, it is difficult to accurately position or align the respective jointing surfaces, when connected.

Moreover, depending on a shape or a position of the jointing surface, there is a fear such that each frame may be deformed by influence of thermal stress in a welding process. In particular, when the joining portion between the frames has a complicated matching surface as in the frame disclosed in Patent Document 2, such deformation noticeably occurs, thus being inconvenience and undesirable.

Furthermore, such deformation and the difficulty in positioning may result in displacement of a jointed main frame in appearance or variations between individual frames, thus being also inconvenient.

SUMMARY OF THE INVENTION

The present invention was conceived in consideration of the circumstances mentioned above, and accordingly, an object of the present invention is to provide a vehicle body frame of a motorcycle capable of facilitating connection working of separated structures or parts and providing good appearance after connection.

The above and other objects can be achieved according to the preferred embodiment of the present invention, which provides a vehicle body frame of a motorcycle including:
a head pipe;
a pair of left and right tank rail portions including a widening portion having a width increasing in a vehicle width direction, on a plan view of a vehicle, extending rearward of the vehicle from the head pipe, a parallel portion having a substantially fixed width in the vehicle width direction, and a narrowing portion having a width decreasing the vehicle width direction, the widening portion, the parallel portion and the narrowing portion subsequently extending along left and right sides of the vehicle body of a motorcycle, respectively; and
a pair of left and right rear arm bracket portions bending and extending from rear ends of the tank rail portions, respectively,
wherein the vehicle body frame is constituted by a front frame part and a rear frame part connected through a frame connecting surface substantially perpendicular to an axial direction of the parallel portion.

In the above aspect of the present invention, the vehicle body frame of a motorcycle may further include:
an engine suspension stay portion provided substantially downward from the tank rail portion across the front frame part and the rear frame part, the engine suspension stay portion being provided with a front engine suspension portion so as to support a front portion of an engine of the motorcycle,
wherein the engine suspension stay portion includes a front stay part and a rear stay part connected through a stay connecting surface, and the front engine suspension portion is disposed to the front stay portion.

It may be desired that the engine suspension stay portion is a frame member having an inverted triangular shape including the tank rail portion on one side, the front engine suspension portion is disposed in a vicinity of a vertex of the inverted triangular shape, and the stay connecting surface is disposed in a vicinity of the front engine suspension portion. The front stay part and the rear stay part may preferably be integrally formed with the front frame part and the rear frame part, respectively.

It may be further desired that the front stay part is formed to be thicker than the rear stay part.

The vehicle body frame of a motorcycle of the structures and characters mentioned above can facilitate connection of separated structures and provides good appearance after connection.

The nature and further characteristic features may be made clearer from the following descriptions made with reference to the accompanying drawings.

DESCRIPTION OF THE PREFERRED EMBODIMENT

An embodiment of a vehicle body frame of a motorcycle according to the present invention will be described hereunder with reference to the accompanying drawings. It is further to be noted that terms "upper", "lower", "right", "left" and like terms are used herein based on the illustrated state or in a standing state of a motorcycle with a driver riding thereon.

Figure 1:
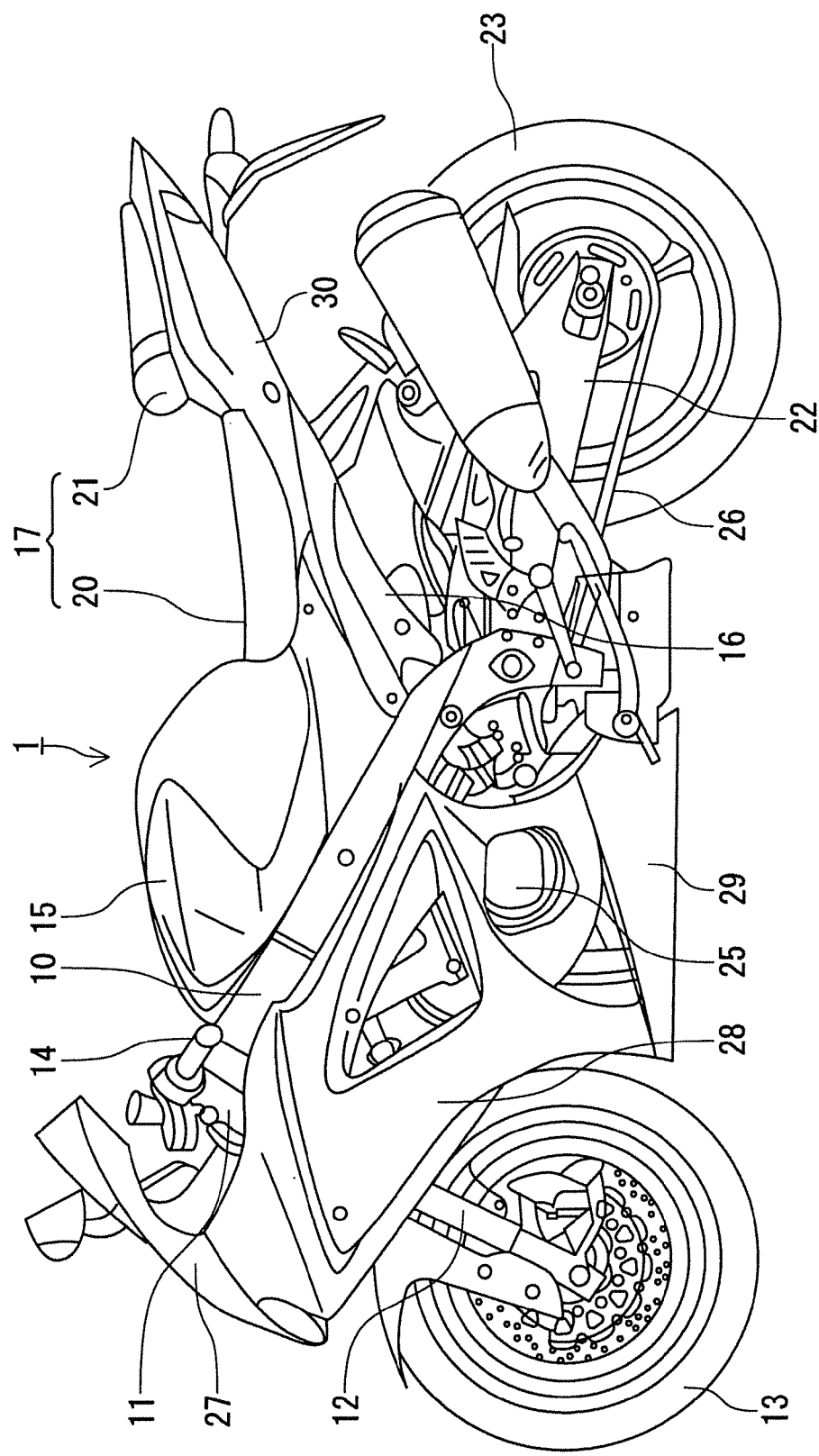
FIG. 1 is a side view of a motorcycle to which an embodiment of a vehicle body frame of a motorcycle according to the present invention is applied.

FIG. 1 is a side view of a motorcycle 1 to which an embodiment of a vehicle body frame of the motorcycle 1 according to the present invention is applied.

The motorcycle 1 includes a pair of left and right main frames 10 (vehicle body frame) extending in a front/rear direction (longitudinal direction) along a vehicle running direction. The main frame 10 is made of, for example, an aluminum alloy material. The main frame 10 includes a head pipe 11 at a front end. The head pipe 11 supports a steering shaft, not shown, rotatably in a certain range. The steering shaft rotatably supports a front wheel 13 via a pair of left and right front forks 12.

In an upper portion of the head pipe 11, a handlebar 14 is rotatably integrally connected to the steering shaft. The front wheel 13 is rotated in a certain range by steering the handlebar 14.

In an upper portion of the main frames 10, a fuel tank 15 is arranged across the left and right main frames 10. To rear portions of the main frames 10, a pair of left and right seat rails 16 is connected. Each seat rail 16 extends obliquely upward in a rear direction from a connecting portion to the main frame 10. In an upper portion of the seat rail 16, a seating seat (driver seat) 17 is provided. The seating seat 17 includes a front seat 20 and a rear seat 21. The front seat 20 is placed immediately behind the fuel tank 15. The rear seat 21 is disposed in an upper position behind the front seat 20.

Furthermore, a swing arm 22 is swingably connected to a rear lower portion of the main frame 10, and the swing arm 22 extends rearward from a connecting portion to the main frame 10. A rear wheel 23 is rotatably supported at a rear end of the swing arm 22. A power of an engine 25 suspended in a front lower portion of the main frame 10 is transmitted to the rear wheel 23 through a power drive mechanism, such as a drive chain 26, so as to drive and rotate the rear wheel 23.

The motorcycle 1 is substantially covered with an external cover (vehicle body cover). The external cover includes a front cover 27 disposed in a front portion of the main frame 10, a side cover 28 that covers a side surface of the vehicle, a lower cover 29 that covers a lower portion of the vehicle, and a rear vehicle body cover (rear cover) 30 that covers the seat rail 16.

Figure 2:
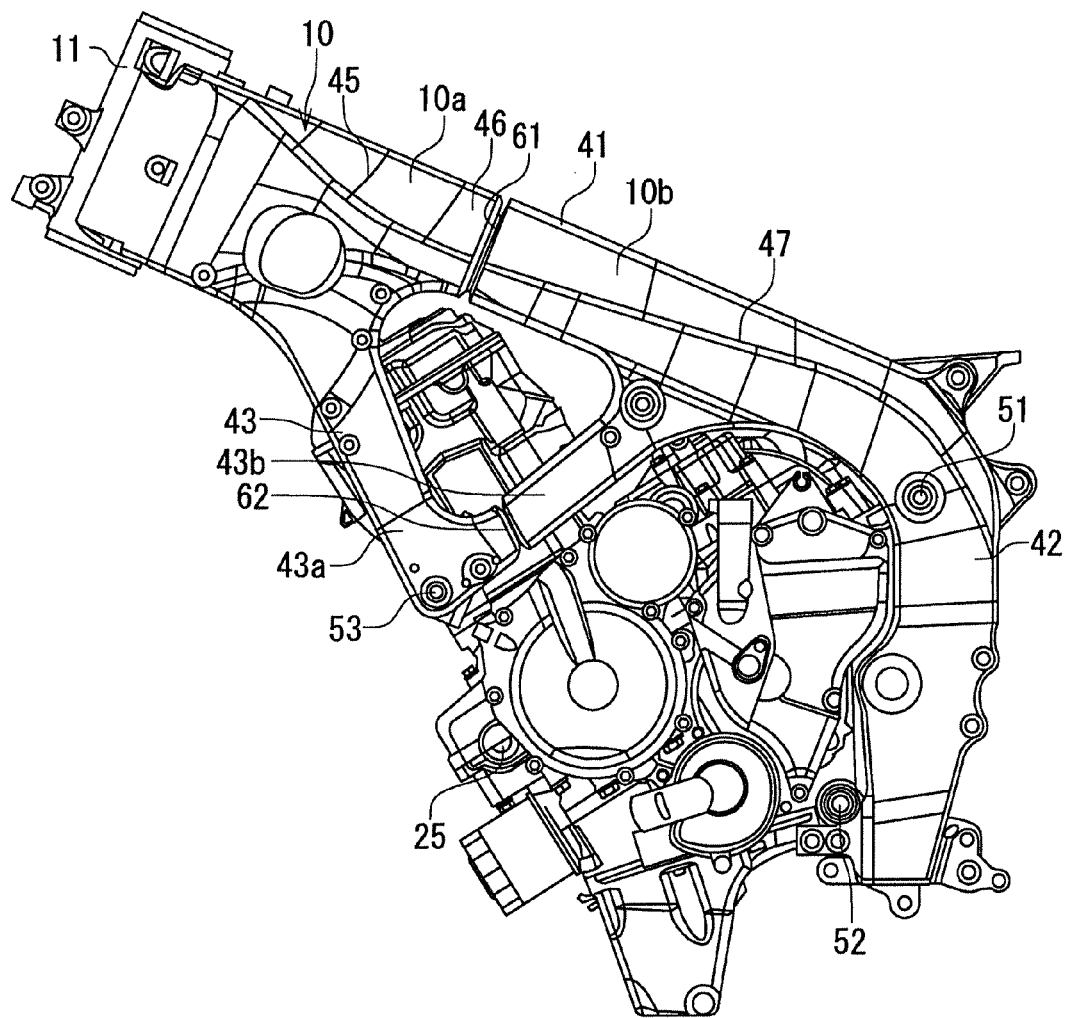
FIG. 2 is a left side view particularly showing the vehicle body frame and an engine of the motorcycle in the embodiment of FIG. 1.
Figure 3:
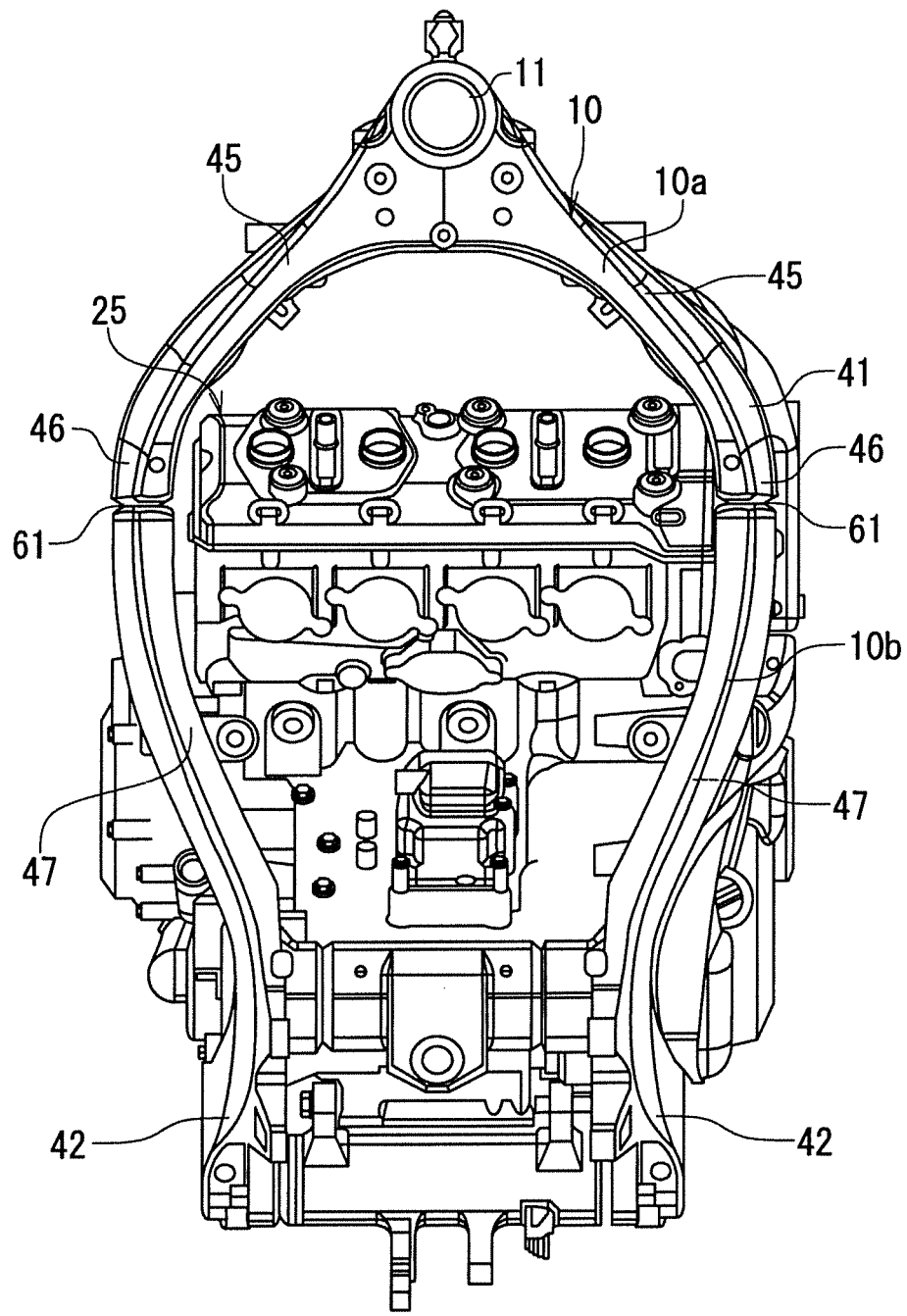
FIG. 3 is a plan view particularly showing the vehicle body frame and the engine of the motorcycle in the embodiment of FIG. 1.

FIGS. 2 and 3 are left side and plan views particularly showing the vehicle body frame (main frame 10) and the engine 25 of the motorcycle, respectively, according to the present embodiment.

With reference to FIGS. 2 and 3, in the following description, among the pair of left and right main frames 10 (including a pair of left and right tank rail portions 41, a pair of left and right rear arm bracket portions 42, and a pair of left and right engine suspension stay portions 43), only the left main frame 10 will be mainly described for the sake of easy understanding. The right main frame 10 is substantially the same as the left main frame 10, and thus descriptions thereof will be omitted herein.

The main frame 10 mainly includes a tank rail portion 41, a rear arm bracket portion 42, and an engine suspension stay portion 43.

The tank rail portion 41 extends downward in a rear direction from the head pipe 11. The tank rail portion 41 includes, successively from the head pipe 11, a widening portion 45 in which a space between the left and right main frames 10 increases rearward of the vehicle so as to provide a V-shape on a plan view of the vehicle, a parallel portion 46 having a substantially fixed space in the vehicle width direction, and a narrowing portion 47 having a decreasing space in the vehicle width direction.

The rear arm bracket portion (center frame portion) 42 is bent so as to extend downward from a rear end of the tank rail portion 41. In the rear arm bracket portion 42, the two rear engine suspension portions 51 and 52 that support a rear portion of the engine 25 are provided in upper and lower positions. One (upper) rear engine suspension portion 51 is provided in a bent portion of the rear arm bracket portion 42 (main frame 10), and the other (lower) rear engine suspension portion 52 is provided in a rear end (lower end) of the rear arm bracket portion 42.

The engine suspension stay portion 43 is provided substantially downward (V-shape on the side view of the vehicle) from the tank rail portion 41 across a front frame 10a and a rear frame 10b (front frame part 10a and rear frame part 10b). The engine suspension stay portion 43 is a frame member having an inverted triangular shape on the side view of the vehicle including the tank rail portion 41 on one side. Specifically, the engine suspension stay portion 43 is a frame member extending from predetermined two points in a longitudinal (front/rear) direction of the tank rail portion 41 and crossing at a predetermined lower position of the tank rail portion 41.

Further, a front engine suspension portion 53 that supports a front portion of the engine 25 is provided at a portion near a vertex of the engine suspension stay portion 43 having the inverted triangular shape. The front engine suspension portion 53 is placed near the vertex of the inverted triangular shape, and the engine 25 thus functions as a part of the vehicle body frame. Accordingly, in comparison with the engine suspension stay portion 43 forming one side on the front side of the inverted triangular shape, rigidity of the engine suspension stay portion 43 forming one side on the rear side is ensured by the engine 25. On the other hand, a concentrated load is applied to one side on the front side of the engine suspension stay portion 43 as the vehicle body frame, and thus, certain rigidity that can bear the concentrated load is demanded. Therefore, one side on the front side of the engine suspension stay portion 43 is preferably formed to be thicker than one side on the rear side of the engine suspension stay portion 43.

The main frame 10 has a two-piece structure including the front frame 10a and the rear frame 10b integrally connected through a frame connecting surface 61. The front frame 10a includes the head pipe 11 and a front side of the tank rail portion 41. The rear frame 10b includes a rear side of the tank rail portion 41 and the rear arm bracket portion 42. Each one of the front frame 10a and the rear frame 10b is integrally formed by casting means, and then integrally joined by joining means, such as welding, so as to constitute the main frame 10.

The frame connecting surface 61 is provided in the parallel portion 46 of the tank rail portion 41. The frame connecting surface 61 is a surface substantially perpendicular to an axial direction of the parallel portion 46 (substantially longitudinal direction of the vehicle). Specifically, a direction normal to the frame connecting surface 61 substantially accord with the longitudinal (front/rear) direction of the vehicle. Thus, the frame connecting surface 61 is provided in a position at which the tank rail portion 41 maximally overhangs in the vehicle width direction.

Since the main frame 10 has the two-piece structure including the front frame part and the rear frame part, the engine suspension stay portion 43 also has a two-piece structure. The engine suspension stay portion 43 includes a front stay part 43a and a rear stay part 43b integrally connected by a stay connecting surface 62. The stay connecting surface 62 is provided in a rear position immediately behind a front engine suspension portion 53 provided near the vertex of the substantially inverted triangular shape and on one side on a rear side of the engine suspension stay portion 43, and the front engine suspension portion 53 is provided in the front stay part 43a.

Specifically, the front stay part 43a includes the engine suspension stay portion 43 that forms one side on the front side of the inverted triangular shape extending downward from the tank rail portion 41, and a part of the engine suspension stay portion 43 that forms the vertex of the inverted triangular shape at which the front engine suspension portion 53 is provided and one side on the rear side extending from the vertex. The rear stay part 43b is a part of the engine suspension stay portion 43 that forms one side on the rear side of the inverted triangular shape extending downward from the tank rail portion 41. The front stay part 43a is integrally formed with the front frame 10a of the main frame 10. The rear stay part 43b is integrally formed with the rear frame 10b.

For the main frame 10 of the motorcycle 1 thus configured, as compared to a case where joining is performed at a portion inclined to a joining direction of the front frame 10a and the rear frame 10b, such as the widening portion 45 or the narrowing portion 47 of the tank rail portion 41, the positional alignment working of joining can be performed at the parallel portion 46 extending in the direction substantially matching the joining direction. As a result, when the front frame 10a and the rear frame 10b formed by casting are joined by a joining method such as welding, the positioning working at the frame connecting surface 61 can be accurately performed, thus increasing the accuracy in the joining operation.

Even if deformation such as shrinkage by thermal stress in a joining process occurs near the frame connecting surface 61, the joining can be performed at the frame connecting surface 61 provided on the parallel portion 46 of the tank rail portion 41. This operation can prevent variations from occurring as compared to the case where the joining process is performed at the widening portion 45 or the narrowing portion 47.

Further, since high joining accuracy can be obtained at the frame connecting surface 61, the positioning working can also be easily performed at the stay connecting surface 62 of the engine suspension stay portion 43. Thus, even if the frame connecting surface 61 and the stay connecting surface 62 are not in one plane, the joining accuracy can be obtained.

Further, the engine suspension stay portion 43 that forms one side on the front side of the inverted triangular shape is formed to be thicker than the engine suspension stay portion 43 that forms one side on the rear side, thereby increasing rigidity of the engine suspension stay portion 43 with a high load.

Furthermore, since the main frame 10 has the separated structure at the parallel portion 46 of the tank rail portion 41, one of the front and rear frames 10a and 10b can be prevented from extremely increasing in size. This advantage can contribute the realization of the dimensional accuracy of the front frame 10a and the rear frame 10b as casted products.

It is further to be noted that the present invention is not limited to the described embodiment, and many other changes and modifications may be made within the scopes of the appended claims.

What is claimed is:

1. A vehicle body frame of a motorcycle comprising:
a head pipe;
a pair of left and right tank rail portions including a widening portion having a width increasing in a vehicle width direction, on a plan view of a vehicle, extending rearward of the vehicle from the head pipe, a parallel portion having a substantially fixed width in the vehicle width direction, and a narrowing portion having a width decreasing the vehicle width direction, the widening portion, the parallel portion and the narrowing portion subsequently extending along left and right sides of the vehicle body of a motorcycle, respectively;
a pair of left and right rear arm bracket portions bending and extending from rear ends of the tank rail portions, respectively; and
an engine suspension stay portion provided substantially downward from the tank rail portion across a front frame part and a rear frame part, the engine suspension stay portion being a frame member having an inverted triangular shape including the tank rail portion on one side,
wherein the parallel portion is formed to the engine suspension stay portion and the tank rail portion forms the inverted triangular shape, and
wherein the vehicle body frame is constituted by the front frame part and the rear frame part connected through a frame connecting surface substantially perpendicular to an axial direction of the parallel portion,
wherein the engine suspension stay portion is provided with a front engine suspension portion so as to support a front portion of an engine of the motorcycle, and the engine suspension stay portion includes a front stay part and a rear stay part connected through a stay connecting surface, and the front engine suspension portion is disposed to the front stay portion,
wherein the front engine suspension portion is disposed in a vicinity of a vertex of the inverted triangular shape, and the stay connecting surface is disposed in a vicinity of the front engine suspension portion, and
wherein the front stay part and the rear stay part are integrally formed with the front frame part and the rear frame part, respectively, in a manner such that the front frame part is formed by integrally casting the head pipe, a front side of the tank rail portion and a front stay of the front engine suspension portion of the engine suspension stay portion, and the rear frame part is formed by integrally casting a rear side of the tank rail portion and the rear arm bracket.

2. The vehicle body frame of a motorcycle according to claim 1, wherein the front stay part is formed to be thicker than the rear stay part.

* * * * *